United States Patent [19]

Ehlert et al.

[11] Patent Number: 4,563,432
[45] Date of Patent: Jan. 7, 1986

[54] PRODUCTION OF POROUS SINTERED CERAMIC MATERIAL

[75] Inventors: Walter Ehlert; Karl-Heinz Reuter, both of Bochum; Klaus-Jürgen Dietzel, Bonn, all of Fed. Rep. of Germany

[73] Assignee: Dr. C. Otto & Comp. G.m.b.H., Bochum, Fed. Rep. of Germany

[21] Appl. No.: 544,401

[22] Filed: Oct. 21, 1983

[30] Foreign Application Priority Data

Oct. 21, 1982 [DE] Fed. Rep. of Germany ....... 3239033

[51] Int. Cl.$^4$ ...................... C04B 38/06; B29C 67/20
[52] U.S. Cl. ...................................... 501/81; 264/42; 264/44
[58] Field of Search ................... 501/80-85; 264/42, 44

[56] References Cited

U.S. PATENT DOCUMENTS

| | | | |
|---|---|---|---|
| 1,934,383 | 11/1933 | Stafford | 264/44 X |
| 1,938,170 | 12/1933 | Bellamy | 264/44 |
| 3,536,480 | 10/1970 | Winkler | 264/44 X |
| 3,899,555 | 8/1975 | Takao et al. | 264/44 |
| 4,236,931 | 12/1980 | Kiehl et al. | 501/80 X |
| 4,438,055 | 3/1984 | Van der Velden | 264/44 |

Primary Examiner—Donald R. Valentine
Attorney, Agent, or Firm—Thomas H. Murray; Clifford A. Poff

[57] ABSTRACT

A ceramic, in particular refractory product is provided comprising a matrix material which contains pores and where the pores are obtained by driving off of opening materials. The product is characterized by pores which are of a flattened shape resulting from platelet shape or flake shape voids. The invention further provides a method for the production of the ceramic product, where a platelet shaped opening material is admixed to the ceramic raw material. The resulting products are characterized by advantageous strength and thermal insulation properties.

17 Claims, 3 Drawing Figures

FIG.1
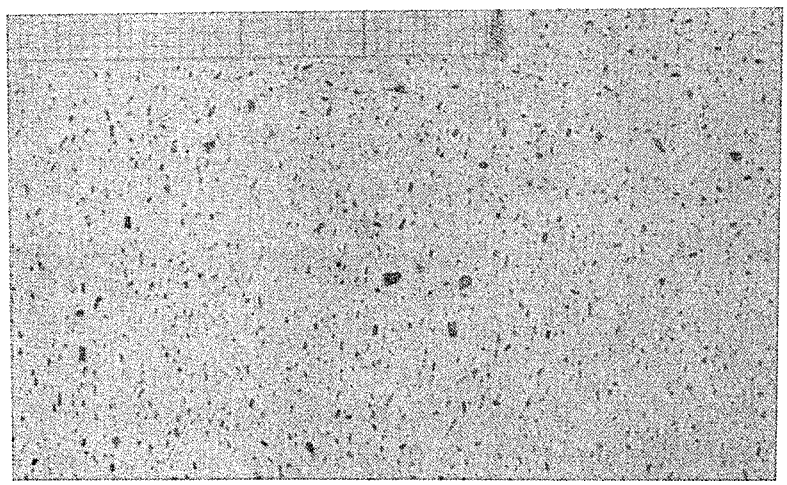
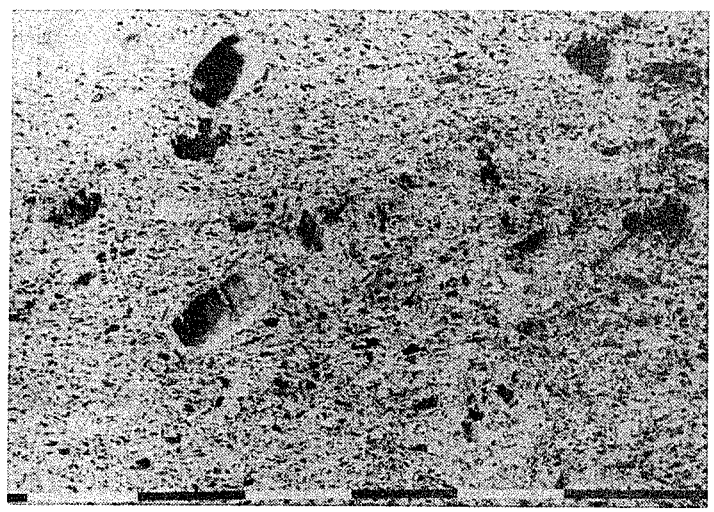
FIG.2

PRODUCTION OF POROUS SINTERED CERAMIC MATERIAL

BACKGROUND OF THE INVENTION

1. Field of the Invention

The present invention relates to a porous ceramic product and to a method for its manufacture, which product can be employed in particular as lightweight brick.

2. Brief Description of the Background of the Invention Including Prior Art

Ceramic materials are in general provided with a porosity which depends on and is generated by the composition of the raw materials, the grain structure of the raw materials and the driving out of the water during drying and firing. This "natural" porosity is insufficient for application situations where it is important to assure a good thermal insulation in addition to the refractory properties. Ceramic products are provided with additional pores for this purpose. This incorporation of pores can be generated with so-called "opening materials". These materials are additives which burn, fuse off, melt out, evaporate or gasify and are provided as particles or the like which are mixed into the ceramic mass and which take up a predetermined volume. In the case of a temperature increase these materials escape as a vapor, as a gas or as a liquid sometimes without leaving residues, where the space originally taken by the particles remains as a pore volume, whereby the pore incorporation results, that is the additional porosity besides the "natural" porosity.

The "opening materials" are in most cases organic materials such as saw dust, cork powder, porous polymerized styrenes, naphthalene or the like. In addition inorganic, porous additives are known such as perlite, foamed glass, vermiculite, expanded clay granulates, diatomaceous earth, kieselguhr or the like, which can lose their own porosity during the ceramic firing precess by way of melting down, where possibly a reaction with the matrix material occurs and a hollow space or, respectively, a pore is formed at the place where the grain of the additive material was disposed before. The use of foaming and/or swelling chemicals, which generate a ball shaped porosity before and during the firing of the ceramic material provides another way for generating pores in ceramic products.

The majority of the additives are more or less of a ball shaped grain structure. Saw dust and fiber materials are an exception in this regard. Since the specific weight of the additives is in general relatively low compared to the other ceramic raw materials to which they are admixed, it is in general necessary to make special provisions so that an effective mixing is assured, that is, the dispersion of the additives in the ceramic raw mass is achieved, and this in turn results in a homogeneous pore distribution of the pores in the fired product. In most cases the homogeneous distribution is not achieved because the additives are provided with a wide grain size distribution and the small particles behave differently from the large particles during the mixing process. Even in the case where an additive with a narrow grain size distribution is employed it is hardly possible to realize homogeneous distributions. The quality of the fired products suffers from the inhomogeneous distribution, not only with regard to the strength, but also, in particular, with regard to its thermal conductivity properties.

SUMMARY OF THE INVENTION

1. Purposes of the Invention

It is an object of the present invention to provide porous ceramic materials with improved thermal conductivity properties without sacrificing strength at the same time.

It is another object of the present invention to control the structure of the voids in porous ceramic materials.

It is a further object of the present invention to provide a method for the production of improved refractory lightweight products such as lightweight bricks and lightweight masses.

These and other objects and advantages of the present invention will become evident from the description which follows.

2. Brief Description of the Invention

The present invention provides a sintered ceramic material, which comprises a matrix material including pores, where the prevailing pore volume is provided by closed pores having an elongated void shape. Preferably, the sintered ceramic material is a refractory material. The predominant part of the closed pores can be formed as platelet shaped and/or flake shaped voids. Preferably, the closed pores are uniformly and randomly distributed in the ceramic matrix material. Preferably, the voids have sizes corresponding to a narrow maximum of the size distribution.

An additional group of pores can be provided, which have substantially smaller dimensions as compared with the voids. Preferably, the pores of the group of pores with the smaller dimensions are distributed uniformly and randomly in the matrix material. It is desirable if the pores of the group of pores with the smaller dimensions provide a second narrow maximum in the distribution of the sizes of the pores. The voids can be formed by employing flake shaped naphthalene. Preferably, the voids correspond to opening materials, which were driven out. It is preferred for the matrix material to be an aluminum silicate.

There also is provided a method to produce a sintered ceramic material which comprises admixing a platelet shaped opening material to the ceramic raw starting mass. The amount of opening material employed can be from about 30 to 80 weight percent of the dry total mass. The particles of the opening material can have average thicknesses of from about 0.4 to 0.8 millimeter and and have average maximum dimensions of up to about 10 millimeters.

The particles of the opening material can be broken up during the mixing step by appropriate mixing procedures. A mixer can be employed for mixing where shearing forces are exerted on the particles to be mixed during the mixing step. Preferably, platelet shaped and/or flake shaped naphthalene is employed as the opening material. The platelet shaped and/or flake shaped napthalene can be comminuted with a comminution aggregate which results in the exertion of large shearing forces on the particles. The raw starting material can be fired at temperatures above 1200 degree centigrade and the thus generated product can comprise at least about 90 weight percent in aluminum oxide and silicon dioxide.

There is further provided a starting composition for producing sintered ceramic material with controlled pores which comprises from about 10 to 50 weight percent clay suitable for the production of refractory materials, greater than 0 and up to 10 weight percent of lightweight chamotte powder, and from about 40 to 80 weight percent naphthalene flakes and preferably from about 20 to 40 weight percent clay suitable for the production of refractory materials, from about 2 to 8 weight percent lightweight chamotte powder and from about 55 to 75 weight percent of naphthalene flakes. An amount of from about 10 to 25 weight percent in water can be admixed to allow grinding and/or forming of the mass.

The novel features which are considered as characteristic for the invention are set forth in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

In the accompanying drawing, in which are shown several of the various possible embodiments of the present invention:

FIG. 1 is a view of an enlarged structure of a lightweight brick according to the invention at a scale of 1:2, FIG. 2 is a view of the enlarged structure at a scale of 1:20.

DESCRIPTION OF INVENTION AND PREFERRED EMBODIMENTS

Figure 3:
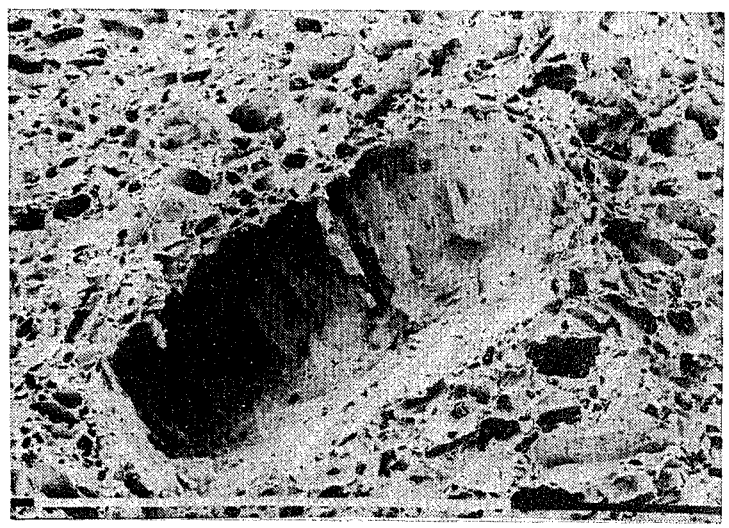
FIG. 3 is a view of a flake shaped pore in the matrix of a brick at a scale of 1:80.

In accordance with the present invention there is provided a ceramic, in particular refractory product of possibly a ceramic matrix material provided with "natural" pores, which contains pores generated by the driving off of "opening materials", which pores are predominantly formed as plate shaped and/or as flake shaped voids. Preferably at least about 50 volume percent of such voids are formed as plate shaped and/or flake shaped voids and more preferably at least about 90 volume percent of such voids are formed as plate shaped and/or flake shaped voids. Preferably such voids 1 are distributed in the ceramic product material 2 statistically, homogeneously, uniformly and at random. The voids can be distributed according to size with a narrow maximum in the distribution curve. The matrix 2 can further comprise pores 3, which have substantially smaller dimensions as compared with the pores 1. The pores 3 can be distributed statistically, homogeneously, uniformly and at random in the matrix material. The group of pores 3 can have a distribution curve giving a further narrow maximum. Such porous materials can be produced by employing flake shaped naphthalene in the starting material.

A method is also provided for the production of one of the above ceramic products where a platelet shaped "opening material" is admixed to the ceramic raw mass. The opening material can amount to from 30 to 80 weight percent as referred to the total dry mass. The particles of the "opening material" can be provided with the following dimensions: thickness of from about 0.4 to 0.8 millimeter, longest extension up to about 10 millimeter.

The mixing procedure can be performed with a flake shaped opening material such that breaking of the flakes is induced. A mixer can be employed which exerts shearing forces at the particles to be mixed during the mixing operation. Platelet shaped or flake shaped naphthalene can be employed as an opening material. The platelet shaped naphthalene can be comminuted with a comminution aggregate, which results in the exertion of large shearing forces on the particles.

The platelets or flakes are formed very thin or, respectively, flat and their thickness is small as compared to their long extension. In general, they are delineated by substantially planar top and bottom faces disposed parallel to each other, where the side edges can be irregular, multi-edged and/or polyhedral.

According to the invention, the platelet pores or, respectively, the flake pores are distributed homogeneously in the matrix of the product, where their spacial location is preferably irregular or, respectively, statistically distributed. Advantageously, their dimensions result in a maximum of the pore distribution, which can be clearly distinguished from a maximum of those (natural) pores, which are contained in the matrix of the product. The concept matrix is employed in the context of the present invention as the material which surrounds the larger class of pores and which contains the clearly smaller pores, which then result in a second maximum of the pore distribution. The invention product can show at least two clear maxima in the distribution curve for the pore dimensions and/or pore volumes. In contrast, known products produced based on ground, granular naphthalene do not show such a characteristic pore distribution with very narrow maxima.

It is surprising that the platelet or, respectively, flake shaped pore form results in superior properties of the final product. Conventional understanding assumes that the ball shaped pore assures the best properties of the ceramic product both with respect to strength as well as to thermal insulation. It is not known why the products with the invention distribution and shape of pores show improved properties.

It is by no means obvious how to produce platelet shaped or, respectively, flake shaped pores, since as is known platelet shaped and flake shaped additives generate even larger problems during the homogeneous distribution of the particles as compared with ball shaped or more or less cubical grains. Based on their flat dimension, platelets and flakes tend to agglomerate to a larger extent and have a tendency to result in layered oriented inhomogeneous distributions.

Surprisingly, these problems are not encountered in the case of using flake shaped naphthalene in particular if the platelets of the additive are employed with larger dimensions, which are preferably reduced in size and comminuted during the mixing step. The employment of coarse grain additives is in general contrary to logic in cases where one desires to produce pores, which are smaller than the coarse grain.

According to a particular embodiment of the invention platelet shaped naphthalene is employed as an additive. Such a product can be obtained commercially, however, so far it has not been employed in the production of refractory, lightweight bricks or lightweight masses based on the reasons set forth above, each though it has been known for quite some time to how produce porous, ceramic, refractory lightweight products by mixing of naphthalene together with water containing raw masses. After the forming or molding and drying the naphthalene is melted out and/or evaporated by heating from the ceramic semifinished product, where the naphthalene leaves pores in the ceramic product, the spectrum of which corresponds to the grain size spectrum of the material to be ground. The gaseous or liquid naphthalene can be recovered from renewed use as a material for providing pores.

Since it is known that the thermal insulation is better the smaller the pores and the narrower the spectrum of pores and since these properties cannot be achieved with the dry naphthalene grinding material, it has been proposed recently to employ besides the dry naphthalene grinding mixture small particles provided as naphthalene sludge, which comprises naphthalene particles with dimensions of from 1.0 to 10 micrometers. In contrast, the invention teaches a completely different way, that is the use of coarse particle or large size dry naphthalene particles with particle dimensions, which are larger than the size of the pores desired, and in fact in the form of platelets or flakes. Preferably, the comminution and homogeneous distribution of the naphthalene occurs during the mixing step, for which no particular special provisions are required as compared to conventional mixing procedures. Preferably, the ratio of the longest dimension of the pores to the thinnest dimension is from about 5 to 20.

However, it is advantageous to employ a mixing apparatus, which is provided with a centrifugal separator and which exerts large shearing forces on the material to be ground. Surprisingly, such an apparatus effects a comminution with a very narrow band of grain sizes in the particle size range under 20 microns and a homogeneous distribution also of the fine grain component of the additive is achieved in the ceramic raw mass. It is surprising in this context that a band of grain sizes with a narrow spectrum of grain sizes is generated, where substantially the platelet or, respectively, flake like grain shape remains preserved.

The naphthalene obtainable commercially in flake form is produced for example by immersing a rotating roller cooled from the inside into a bath with liquid naphthalene. A solid layer of naphthalene then forms on the surface of the roller, which layer comprises naphthalene crystals with are grown together or, respectively, cemented together. Flakes are generated by stripping the layer from the roller, which comprise many individual crystals. Based on the comminuting a breaking up into smaller flakes or single crystals or single crystal groups is achieved, where each single crystal group comprises several individual single crystals. In accordance with the use in the present invention, the one maximum of the pore distribution is formed from the small flakes and the other maximum of the pore distribution is formed from the single crystals or, respectively, single crystal groups. This advantageous distribution of the pores, which in particular results from the application of large shearing forces upon comminution of the flakes and in particular from the joint treatment with the other raw materials of the ceramic mass, could not be anticipated. Such a comminution cannot be achieved with granular naphthalene and thus the conventional products do not exhibit the advantages obtained according to the present invention.

The dimensions of the naphthalene flakes available commercially are:
  Thickness: 0.3 to 2 millimeter
  Longest dimension: up to about 25 millimeter Flakes of the following dimensions are preferred in the context of the present invention:
  Thickness: 0.4 to 0.8 millimeter
  Longest dimension: up to about 10 millimeter These flakes can be comminuted before the admixture to the ceramic raw mass preferably with a grinding mill, which generates large shearing forces (for example an impact mill, a pulverizer mill, or centrifugal separator). As mentioned, it then surprisingly resulted that upon breaking, flakes are obtained with dimensions which are within a very narrow grain size spectrum. In addition, it was surprisingly found that a large part of the flakes are separated into single crystals, whereby a further narrow maximum in the grain size distribution curve results. For example, the comminution of the flakes into single crystals or, respectively, single crystal groups can be performed, from which a product can be obtained, which exhibits very small pores, the maximum of distribution of which is very narrow and where no other synthetically introduced group of pores (Maximum of pore distribution) is present.

The comminuted flakes of naphthalene and the individual crystals or, respectively, individual crystal groups can be added without further treatment as usual to the ceramic mass,, whereby a relatively good dispersion is achieved. The good dispersion or, respectively, the homogeneous distribution of the flakes as well as their irregular disposition or, respectively, orientation in the mass results after the usual driving out of the naphthalene in a flake pore structure with pores, where the orientation, disposition and dimensions correspond to the position of the naphthalene flakes in the raw mass. However, a particularly homogeneous structure of the flakes with many small pores with a narrow maximum of the pore distribution curve is achieved, if as described above, the comminution process is performed during the mixing of the additive with the ceramic material and thereby large shearing forces are employed.

The invention is further illustrated by way of the following examples.

A ceramic mass is produced from the following components:
  20 weight percent refractory clay 1
  10 weight percent refractory clay 2
  5 weight percent lightweight chamotte powder (grog)
  65 weight percent naphthalene flakes (flake thickness about 0.5 millimeter, longest extension about 8 millimeter).

The components are dry mixed for about 5 minutes in a positive mixer. Then 16 weight percent water, as referred to the dry mass are added and the mixing is continued for another ten minutes. The ceramic mass resulting therefrom is formed into bricks, dried, freed from the naphthalene and is ceramically fired and sintered at 1400 degree centigrade. The firing preferably occurs above 1200 degrees and preferred firing times are from about 15 minutes to 24 hours. The refractory fired lightweight brick exhibited the following properties:
  Specific raw density: 0.56 gram per cubic centimeter
  Cold pressure strength: $7.0 N/mm^2$
  Thermal conductivity at 1200 degree centigrade: 0.43 W/mK
  Pore distribution of the pores sizes between 0 and 100 micrometer: 60 percent in the range of between 2 and 6 micrometer For comparison, a mass was produced from the same components. However, instead of the flake naphthalene the usually employed granular naphthalene was employed with a grain size range from 0 to 2.5 millimeter (a finer, comminuted dry material is not available for technical purposes because of the difficulty of comminution). The components are prepared to a ceramic mass in an edge mill and the mass is processed to bricks as described above. The fired bricks have the following properties:

Specific raw density: 0.56 gram per cubic centimeter
Cold pressure strength: 6.2N/mm$^2$
Thermal conductivity at 1200 degree centigrade: 0.52 W/mK
Pore distribution of the pores sizes between 0 and 100 micrometer: 60 percent in the range of between 2 and 20 micrometer According to a further experiment, the comparison mass was subjected to a positive mixer with a centrifugal separator. The use of the positive mixer with the centrifugal separator did not result in an improvement of the comparison product.

The example illustrates that the employment of flake shaped naphthalene results in a product, which exhibits clearly better properties as compared with the conventional products.

The products obtained according to the invention process show in particular in the high temperature region (1000 to 1200 degree centigrade) a very low thermal conductivity and thereby assure a better thermal insulation as compared with the products, which are produced with a conventional naphthalene addition. This is certainly based on a more uniform pore distribution and possibly also based on the more impeded convection based on the flat pore shape.

The invention refractory lightweight brick is provided with flake pores 1, which are distributed homogeneously and uniformly in the matrix 2 (FIG. 1). The shape of the flake pores 1 results from the comminuted naphthalene flakes. Many flakes 1 can be fomed about like a parallelepiped. The flakes 1 form a group of pores with a narrow maximum in the distribution of the pores.

The matrix 2 contains pores 3, which are also distributed homogeneously and statistically (Figs. 2 and 3). The pores 3 result from the fine grain part of the comminuted flake naphthalene or, respectively, the shape of the single crystals or single crystal groups. The group of the pores 3 shows clearly smaller dimensions as compared with the pores 1. It also forms a further narrow maximum of the pore distribution.

In addition to the pores 1 and 3 generated by the replacement of the naphthalene, micropores 4 are present in the walls of the matrix material 2, which forms the solid and which comprises the fired ceramic material, and the walls surround the pores 1 and 3. These micropores 4 are generated by the displacement of the water from the ceramic mass and they in turn can have their own maximum of the pore distribution curve. This group of pores is also present in known products.

It will be understood that each of the elements described above, or two or more together, may also find a useful application in other types of materials production systems and refractory materials production procedures differing from the types described above.

While the invention has been illustrated and described as embodied in the context of a porous, in particular refractory ceramic product as well as a method for its production, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A sintered ceramic material comprising a refractory matrix material including closed pores, where the prevailing pore volume comprises platelet shaped and-/or flake shaped voids uniformly and randomly distributed in the refractory matrix material, said voids being formed by flake shaped naphthalene.

2. The sintered ceramic material according to claim 1 wherein said closed pores have sizes corresponding to a narrow maximum of the size distribution.

3. The sintered ceramic material according to claim 1 further comprising an additional group of closed pores having substantially smaller dimensions as compared with said voids.

4. The sintered ceramic material according to claim 3 wherein the pores of the group of pores with the smaller dimensions are distributed uniformly and randomly in the refractory matrix material.

5. The sintered ceramic material according to claim 3 wherein the pores of the group of pores with the smaller dimensions provide a second narrow maximum in the distribution of the sizes of the pores.

6. The sintered ceramic material according to claim 1 wherein said voids correspond to said flake shaped naphthalene forming opening materials, which were driven out.

7. The sintered ceramic material according to claim 1 wherein said refractory matrix material comprises at least about 90 weight percent aluminum oxide and silicon dioxide.

8. A starting composition for producing sintered ceramic material with controlled pores comprising
    from about 10 to 50 percent by weight clay suitable for the production of refractory materials;
    greater than 0 and up to 10 percent by weight of lightweight chamotte powder; and
    from about 40 to 80 percent by weight naphthalene flakes.

9. The starting composition for producing sintered ceramic materials with controlled pores according to claim 8 further comprising
    from about 10 to 25 percent by weight of water as referred to the dry weight of the composition.

10. A starting composition for producing sintered ceramic materials with controlled pores wherein the composition comprises
    from about 20 to 40 percent by weight clay suitable for the production of refractory materials;
    from about 2 to 8 weight percent lightweight chamotte powder; and
    from about 55 to 75 percent by weight of naphthalene flakes.

11. A method to produce a sintered ceramic material comprising admixing platelet shaped particles of opening material to the ceramic raw starting mass using mixing procedures to break up at least part of said particles while uniformly and randomly distributing opening material in the ceramic raw mass, and forming closed pores by firing the admixed mass.

12. The method to produce a sintered ceramic material according to claim 11 wherein the amount of opening material employed is from about 30 to 80 percent by weight of the dry total mass.

13. The method to produce a sintered ceramic material according to claim 11 wherein the particles of the opening material have average thicknesses of from about 0.4 to 0.8 millimeter and and have average maximum dimensions of up to about 10 millimeters.

14. The method to produce a sintered ceramic material according to claim 11 wherein said step of using mixing procedures includes employing a mixer for mixing where shearing forces are exerted on the particles of opening material to be mixed during the mixing step.

15. The method to produce a sintered ceramic material according to claim 11 wherein said platelet shaped particles of opening material comprise flake shaped naphthalene.

16. The method to produce a sintered ceramic material according to claim 15 wherein said step of using mixing procedures includes comminuting the flake shaped naphthalene with a comminution aggregate which results in the exertion of large shearing forces on the flake shaped naphthalene.

17. A method to produce a sintered ceramic material comprising admixing an opening material comprising platelet shaped and/or flake shaped naphthalene to a ceramic raw starting mass, comminuting the platelet shaped and/or flake shaped naphthalene with a comminution aggregate which results in the exertion of large shearing forces on the particles, and firing the ceramic raw starting mass at a temperature above 1200 degree centigrade with the resulting product containing at least about 90 percent by weight of aluminum oxide and silicon dioxide.

* * * * *